United States Patent
You et al.

(10) Patent No.: US 9,293,968 B2
(45) Date of Patent: Mar. 22, 2016

(54) MOTOR USING CONNECTION VARYING APPARATUS

(71) Applicant: KOREA ELECTRONICS TECHNOLOGY INSTITUTE, Seongnam-si, Gyeonggi-do (KR)

(72) Inventors: Se Hyun You, Bucheon-si (KR); In Soung Jung, Seoul (KR); Jung Moo Seo, Seoul (KR)

(73) Assignee: KOREA ELECTRONICS TECHNOLOGY INSTITUTE, Seongnam-Si, Gyeonggi-Do (KR)

( * ) Notice: Subject to any disclaimer, the term of this patent is extended or adjusted under 35 U.S.C. 154(b) by 638 days.

(21) Appl. No.: 13/726,372

(22) Filed: Dec. 24, 2012

(65) Prior Publication Data

US 2013/0162073 A1    Jun. 27, 2013

(30) Foreign Application Priority Data

Dec. 26, 2011 (KR) .................. 10-2011-0142724

(51) Int. Cl.
*H02K 11/00* (2006.01)

(52) U.S. Cl.
CPC .......... *H02K 11/001* (2013.01); *H02K 11/0063* (2013.01); *H02K 2203/03* (2013.01)

(58) Field of Classification Search
USPC .......................................... 310/71, 179–210
See application file for complete search history.

(56) References Cited

U.S. PATENT DOCUMENTS

| 5,739,603 | A | * | 4/1998 | Darceot | H02K 3/50 310/71 |
|---|---|---|---|---|---|
| 2002/0185929 | A1 | * | 12/2002 | Jang | H02K 21/16 310/210 |
| 2005/0189828 | A1 | * | 9/2005 | Nakayama | B62D 5/0403 310/71 |
| 2009/0051234 | A1 | * | 2/2009 | Yamane | H02K 3/18 310/71 |

FOREIGN PATENT DOCUMENTS

| JP | 06062556 | 3/1994 |
|---|---|---|
| KR | 1020000060740 | 10/2000 |
| KR | 1020010046394 | 6/2001 |
| KR | 1020050068914 | 7/2005 |

* cited by examiner

*Primary Examiner* — Naishadh Desai
(74) *Attorney, Agent, or Firm* — Hauptman Ham, LLP

(57) ABSTRACT

A motor includes: a first slot and a second slot in which a first current having the same phase flows, the first slot including a first coil end portion in which a current flows in a first direction and a second coil end portion in which a current flows in the opposite direction of the first direction, and the second slot including a third coil end portion in which a current flows in the second direction and a fourth coil end portion in which a current flows in the first direction, a stator forming a fixed magnetic field by the first current, and a rotor forming a rotating field and rotated according to an interaction with the fixed magnetic field formed by the stator.

14 Claims, 7 Drawing Sheets

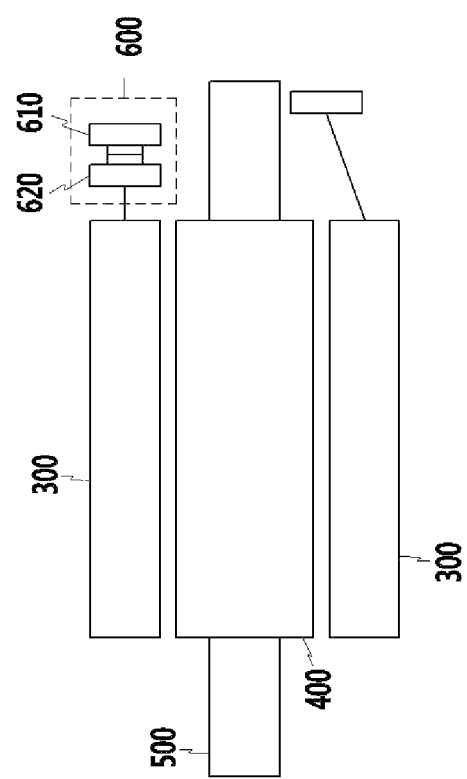

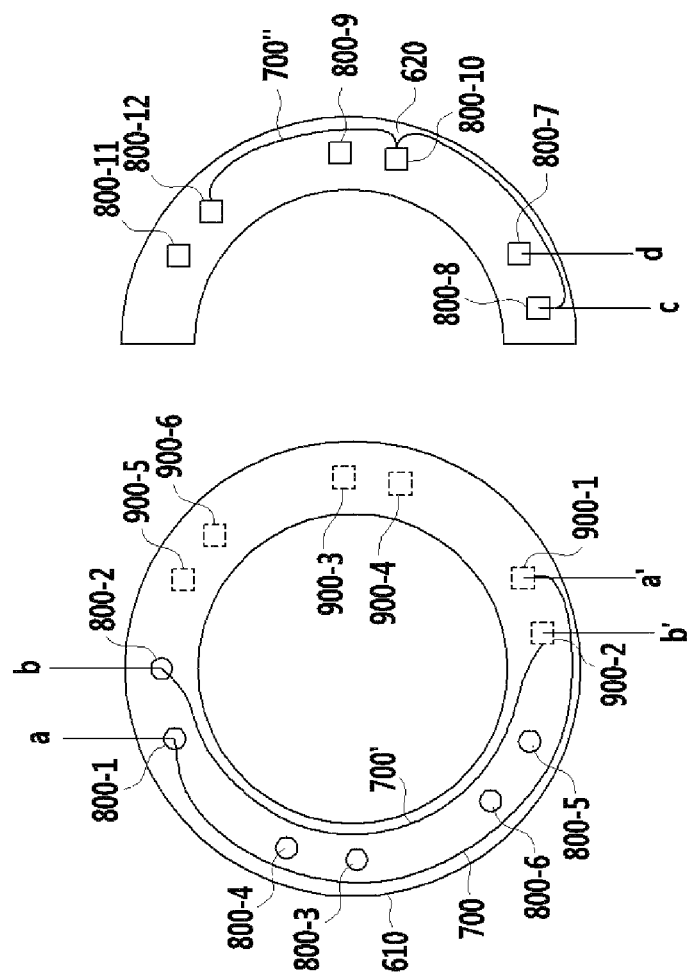

MOTOR USING CONNECTION VARYING APPARATUS

CROSS-REFERENCE TO RELATED APPLICATION

This application claims priority to and the benefit of Korean Patent Application No. 10-2011-0142724 filed in the Korean Intellectual Property Office on Dec. 26, 2011, the entire contents of which are incorporated herein by reference.

BACKGROUND OF THE INVENTION (a) Field of the Invention

The present invention relates to a motor using a connection varying apparatus.

(b) Description of the Related Art

In general, a motor generating power of a rotary motion having outputs with respect to the same appearance, speed, and torque require different input voltages according to users or an application target thereof. In this case, motors are required to be manufactured through separate fabrication processes according to voltage specifications.

The separate fabrication processes lead to an increase in fabrication costs and a fabrication time of motors, which is, thus, disadvantageous in terms of production unit cost.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a connection varying apparatus of a motor having advantages of varying a connection to cope with a change in an external input voltage.

An exemplary embodiment of the present invention provides: a motor including:
a first slot and a second slot in which a first current having the same phase flows, the first slot including a first coil end portion in which a current flows in a first direction and a second coil end portion in which a current flows in the opposite direction of the first direction, and the second slot including a third coil end portion in which a current flows in the second direction and a fourth coil end portion in which a current flows in the first direction; a stator forming a fixed magnetic field by the first current; a rotor forming a rotating field and rotated according to an interaction with the fixed magnetic field formed by the stator; and a connection varying apparatus configured to dispose a winding connected in series or in parallel by selectively connecting one or more of the first coil end portion and the second coil end portion of the first slot and the third coil end portion and the fourth coil end portion of the second slot.

The connection varying apparatus may connect the first slot and the second slot in series by electrically connecting the second coil end portion and the third coil end portion.

The connection varying apparatus may electrically connect the first coil end portion and the third coil end portion, electrically connect the second coil end portion and the fourth coil end portion, and connect the first and second slots in parallel.

The stator includes third and fourth slots in which a second current having a phase 120-degree faster than the first current, and fifth and sixth slots in which a third current having a phase 120-degree slower than the first current, wherein the third slot, the fourth slot, the fifth slot, and the sixth slot may include a coil end portion in a first current direction in which a current flows in the first direction and a coil end portion in a second current direction in which a current flows in the second direction, respectively.

The connection varying apparatus may include: a first PCB including a first coil terminal and a second coil terminal electrically connected to the first coil end portion and the second coil end portion of the first slot, respectively, and a first contact terminal and a second contact terminal electrically connected to the first coil terminal and the second coil terminal, respectively; and a second PCB connected to the first PCB through the first contact terminal or the second contact terminal and including a third coil terminal and a fourth coil terminal connected to the third coil end portion and the fourth coil end portion.

A winding may be connected in the form of any one of a series winding and parallel winding by selectively connecting any one of the first contact terminal and the second contact terminal of the first PCB and any one of the third coil terminal and the fourth coil terminal of the second PCB.

The first PCB and the second PCB may be positioned in an overlap manner, and any one or more of the first contact terminal and the second contact terminal of the first PCB and any one or more of the third coil terminal and the fourth coil terminal of the second PCB may be selectively connected by adjusting a relative rotation angle between the first PCB and the second PCB.

According to an embodiment of the present invention, a connecting method of a coil of a motor can be variably changed according to a change in an external input voltage, thereby facilitating manufacturing of motors having the same output specification without discriminating processes for mass-producing motors.

BRIEF DESCRIPTION OF THE DRAWINGS

FIG. 4 is a view illustrating a structure of a motor including a variable connecting wire device according to an embodiment of the present invention.

FIG. 6 is a view illustrating a connection varying apparatus according to a second embodiment of the present invention.

DETAILED DESCRIPTION OF THE EMBODIMENTS

Figure 1:
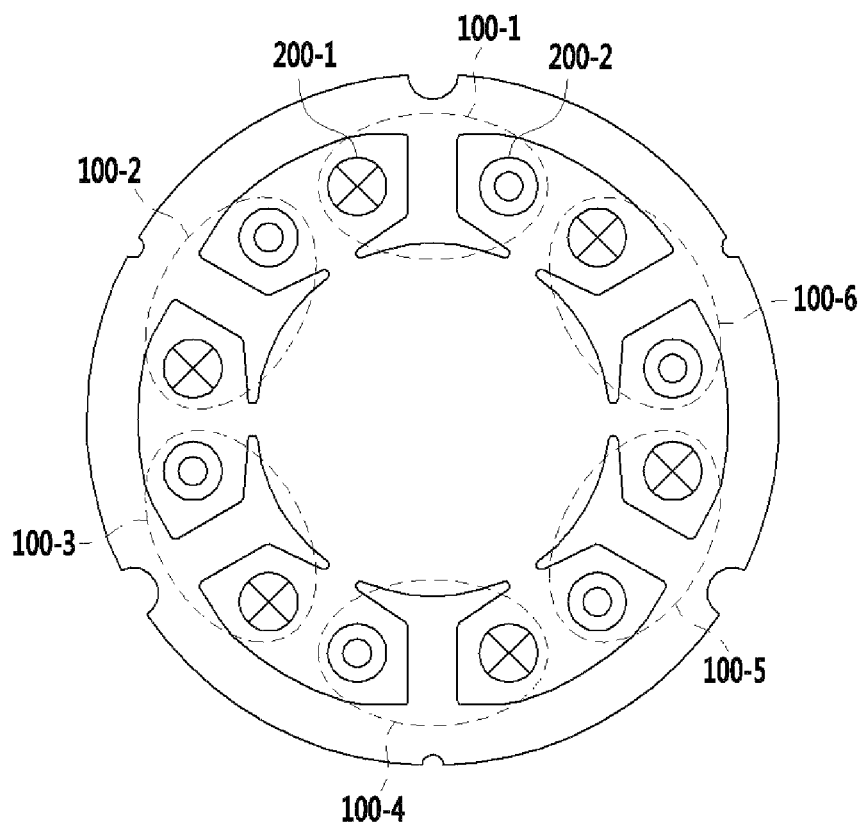
FIG. 1 is a layout view illustrating a wiring according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

A connection varying apparatus of a motor according to an embodiment of the present invention will be described with reference to the accompanying drawings. In an embodiment of the present invention, a brushless DC (BLDC) motor having six slots will be described, but the present invention is not necessarily limited thereto.

FIG. 1 is a layout view illustrating a wiring according to an embodiment of the present invention.

As illustrated in FIG. 1, a plurality of slots are provided to connect a coil within a motor, and in an embodiment of the present invention, a disposition of six slots 100-1 to 100-6 within a motor will be described as an example. Each slot includes two coil end portions. For example, a first slot 100-1 includes a first coil end portion 200-1 as an end portion in which a current flows in a first direction (e.g., a direction in which a coil enters a ground) and a second coil end portion 200-2 as an end portion in which a current flows in a second direction (e.g., a direction in which the coil leaves the ground) opposite the first direction.

Here, the first direction and the second direction do not indicate a fixed direction, respectively, and the first direction and the second direction have relative concepts indicating mutually opposite directions. For example, when a first direction is a direction in which a coil enters the ground and a second direction is a direction in which the coil leaves the ground at a timing t1, at a timing t2, the first direction may be a direction in which a coil leaves the ground and the second direction may be a direction in which the coil enters the ground.

Also, in an embodiment of the present invention, facing slots may be connected to have the same phase, namely, such that the same current is led in, whereby a total of three-phase winding may be configured by connecting two slots in series or parallel with respect to each phase. Namely, a current having the same phase is input to the first slot 100-1 and a fourth slot 100-4, to a second slot 100-2 and a fifth slot 100-5, and to a third slot 100-3 and a sixth slot 100-6.

A winding disposition of a single phase in the winding layout view will be described with reference to FIG. 2.

Figure 2:
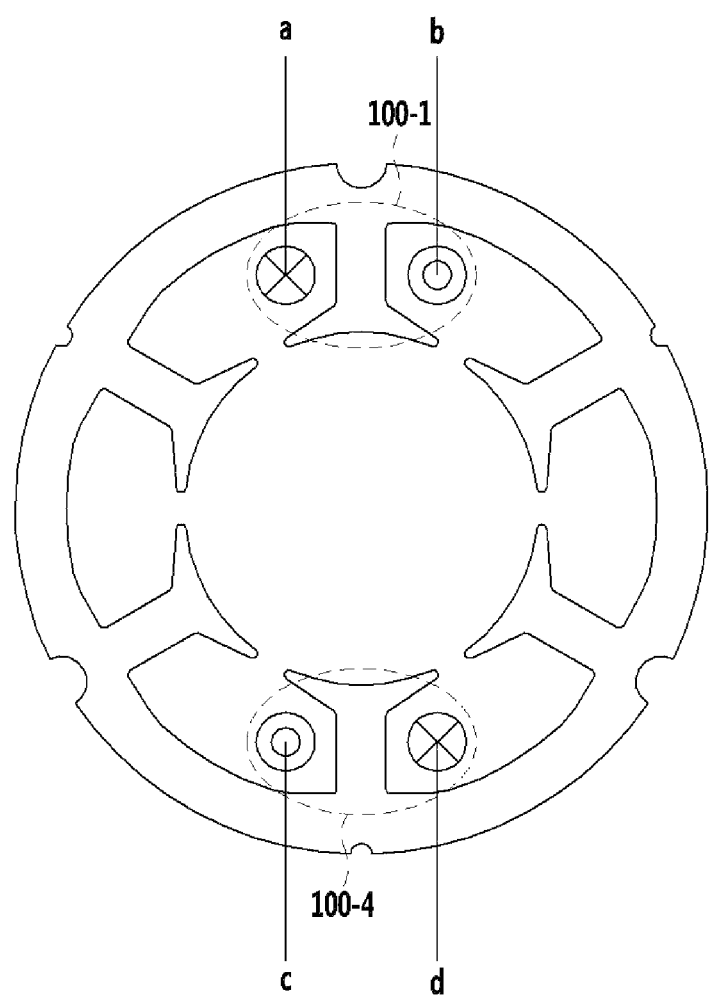
FIG. 2 is a view illustrating a disposition of a single phase wiring according to an embodiment of the present invention.

FIG. 2 is a view illustrating a disposition of a single phase wiring according to an embodiment of the present invention.

As illustrated in FIG. 2, the first slot 100-1 and the fourth slot 100-4 facing the first slot 100-1 are connected by a single phase. The first slot 100-1 includes a first coil end portion (a) in which a current flows in the first direction and a second coil end portion (b) in which a current flows in the second direction. The fourth slot 100-4 includes a third coil end portion (c) in which a current flows in the second direction and a fourth coil end portion (d) in which a current flows in the first direction.

In an embodiment of the present invention, a serial or parallel winding disposition may be implemented by selectively connecting one or more of the first and second coil end portions of the first slot and one or more of the third and fourth coil end portions of the second slot.

First, a series winding disposition will be described with reference to FIGS. 2 and 3A.

According to an embodiment of the present invention, when the second coil end portion (b) in which a current flows in the second direction and the fourth coil end portion (d) in which a current flows in the first direction are connected, the first slot 100-1 and the fourth slot 100-4, two facing slots, to which a current having the same phase (A phase) is applied, are connected in series. In this case, among the first coil end portion (a) and the fourth coil end portion (c), i.e., the other two remaining end portions excluding the second coil end portion (b) and the third coil end portion (d), the first coil end portion (a) is used as an external withdrawal line of the corresponding phase, and the fourth coil end portion (c) is combined to a neutral point so as to be used.

Figure 3A:
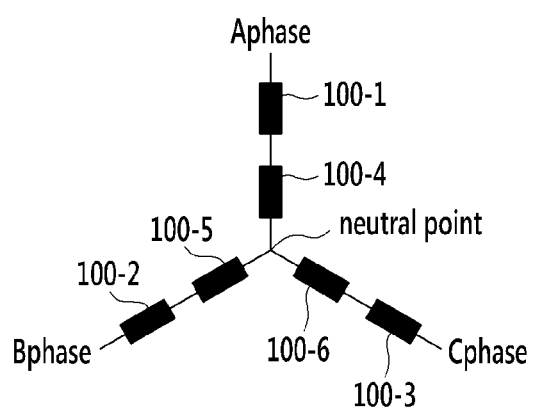
FIGS. 3A and 3B are layout views of 3-phase wiring

Meanwhile, when the second slot 100-2 and the fifth slot 100-5 to which a B-phase current 120-degree faster than the A-phase current applied to the first slot 100-1 and the third slot 100-3 and the sixth slot 100-6 to which C-phase current 120-degree slower than the A-phase current is applied are connected in a similar manner, the 3-phase series winding layout illustrated in FIG. 3A may be obtained.

Referring to the winding disposition in which the slots are connected in series as illustrated in FIG. 3A, the first slot 100-1 is used as an external withdrawal line to which a current with respect to a certain phase, i.e., the A phase, is applied, and the fourth slot 100-4 is coupled to a neutral point so as to be connected to slots to which currents having the other phases, i.e., the B phase and the C phase, are applied.

Also, the second slot 100-2 is used as an external withdrawal line to which a current with respect to the B phase 120-degree faster than the A-phase current is applied, and the fifth slot 100-5 is coupled to a neutral point so as to be connected to slots to which the A-phase and B-phase currents are led in. Similarly, the third slot 100-3 is used as an external withdrawal line to which a current with respect to the C phase 120-degree slower than the A-phase current is applied, and the sixth slot 100-6 is coupled to a neutral point so as to be connected to slots to which the A-phase and B-phase currents are led in. In this case, coupling to the neutral point and a coupling method have been already known, so a detailed description thereof will be omitted in the present embodiment.

A parallel winding disposition will be described with reference to FIGS. 2 and 3B.

Referring to FIG. 2, unlike a serial connection, when the first coil end portion (a) in which a current flows in the first direction and the third coil end portion (d) in which a current flows in the first direction are connected and the second coil end portion (b) in which a current flows in the second direction and the fourth coil end portion (d) in which a current flows in the second direction are connected, the first slot 200-1 and the fourth slot 200-4 are connected in parallel. A first common end portion in which the first coil end portion (a) and the third coil end portion (d) are connected is used as an external withdrawal line, and a second common end portion in which the second coil end portion (b) and the fourth coil end portion (d) are connected is coupled to a neutral point so as to be used.

Meanwhile, when the second slot 100-2 and the fifth slot 100-5 to which the B-phase current 120-degree faster than the A-phase current applied to the first slot 100-1 and the third slot 100-3 and the sixth slot 100-6 to which the C-phase current 120-degree slower than the A-phase current are connected in a similar manner, the 3-phase parallel winding layout may be obtained.

Figure 3B:
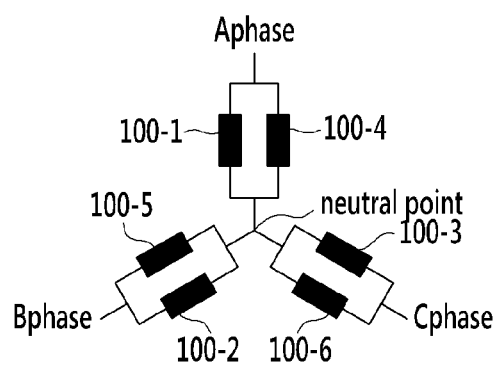

Referring to the winding disposition in which the slots are connected in parallel as illustrated in FIG. 3B, a first common end portion formed as the first slot 100-1 and the fourth slot 100-4 are connected in parallel is used as an external withdrawal line to which a current with respect to a certain phase, i.e., the A phase, is applied, and a second common end portion is coupled to a neutral point so as to be connected to slots to which currents having the other phases, i.e., the B phase and the C phase, are led in.

Also, a third common end portion formed as the second slot 100-2 and the fifth slot 100-5 are connected in parallel is used as an external withdrawal line to which a current with respect to the B phase 120-degree faster than the A-phase current is applied, and a fourth common end portion is coupled to the neural point and connected to slots to which the A-phase and C-phase currents are led in. Similarly, a portion generated as the third slot 100-3 and the sixth slot 100-6 are connected in parallel is used as an external withdrawal line, to which a current with respect to C-phase 120-degree smaller than the A-phase current is applied, and a sixth common end portion is coupled to a neutral point so as to be connected to slots to which the A-phase current and B-phase current are led in. In this case, coupling to the neutral point and a coupling method have been already known, so a detailed description thereof will be omitted in the present embodiment.

As described above, when the winding method in parallel is changed, the total number of turns is reduced to half with respect to a single phase, and this obtains an effect that a diameter of the coil is increased. In other words, when 24V is applied from the outside, the coil is connected in series, and when 12V is applied, the coil is connected in parallel to use the motor, whereby the same output can be obtained in the same motor structure, irrespective of a change in a voltage applied from the outside.

Thus, when a connection varying apparatus capable of connecting a winding of a motor both in series and in parallel is provided, a motor having the same output irrespective of a change in an application voltage may be implemented. A connection varying apparatus will be described by using a motor having six slots with reference to FIG. 4.

FIG. 4 is a view illustrating a structure of a motor including a variable connecting wire device according to an embodiment of the present invention.

As illustrated in FIG. 4, a motor includes a stator 300, a rotor 400, a shaft 500 connected tot the rotor 400 to transmit power, and a connection varying apparatus 600 connected to the stator 300. In an embodiment of the present invention, a motor using a concentrated winding type stator, which has the structure as illustrated in FIG. 4, will be described as an example.

When a current is applied to a coil of the stator 300 by power applied from a power source (not shown), a fixed magnetic field is formed, the rotor 400 is rotated by an interaction between the fixed magnetic field and a rotating field formed in the rotor 400, and accordingly, the motor is rotatably driven.

Such a motor driving method has been already known, so a detailed description of respective components and driving method of the motor in an embodiment of the present invention will be omitted.

Here, the connection varying apparatus 600 connected to the stator 300 to control a winding wound around the stator such that it is connected to any one of a serial form or a parallel form will be described with reference to FIGS. 5 and 6.

Figure 5:
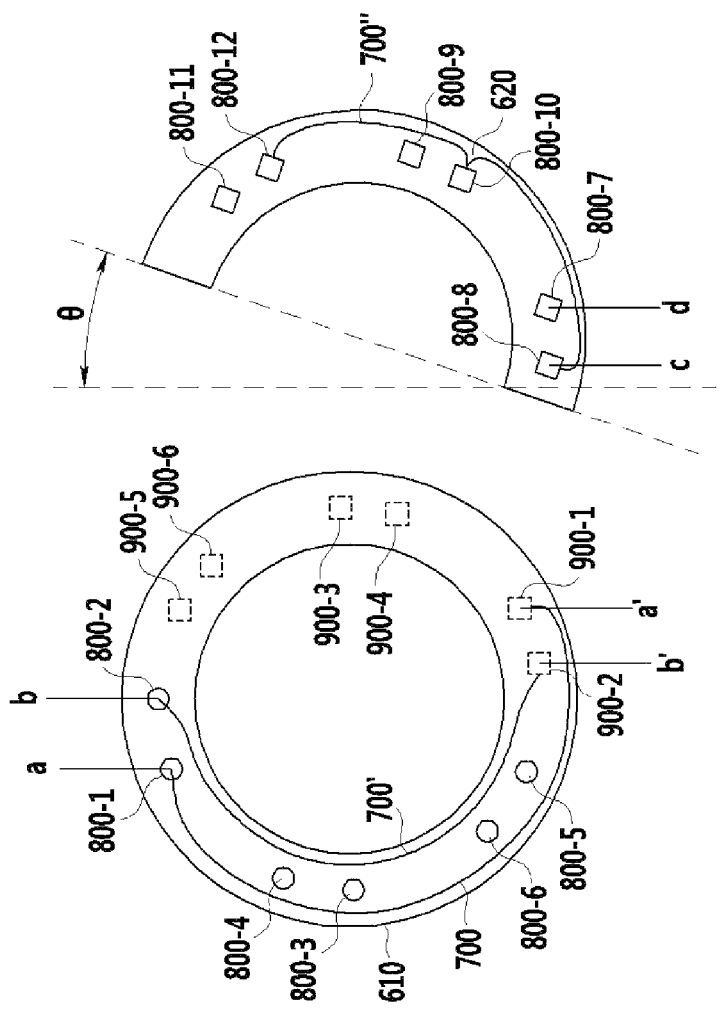
FIG. 5 is a view illustrating a connection varying apparatus according to a first embodiment of the present invention.

FIG. 5 is a view illustrating a connection varying apparatus according to a first embodiment of the present invention, and FIG. 6 is a view illustrating a connection varying apparatus according to a second embodiment of the present invention.

FIG. 5 illustrates the connection varying apparatus 600 when a winding is connected in series. The connection varying apparatus 600 includes two PCBs, and the respective PCBs will be referred to as a first PCB 610 and a second PCB 620.

The first PCB 610 having a circular shape includes coil terminals 800-1 to 800-6 corresponding to a number of coil end portions of the first slot 100-1 to the third slots 100-3. The first PCB 610 further includes contact terminals 900-1 to 900-6 corresponding to the number of coil end portions. Here, the coil terminals 800-1 to 800-6 are terminals to which the coil end portions formed in the first slot 100-1 to the third slot 100-3 are connected, and the contact terminals 900-1 to 900-6 are terminals for connecting the coil terminals 800-1 to 800-6 and the second PCB 720.

Here, for example, a part with respect to the first slot 100-1 will be described. A first coil end portion (a) included in the first slot 100-1 and in which a current flows in the first direction is connected to the first coil terminal 800-1, and a second coil end portion (b) connected to the first coil terminal 800-1, in which a current flows in the second direction, is connected to the second coil terminal 800-2.

In this manner, coils 700 and 700' connected to the first PCB are connected to the contact terminals 900-1 and 900-2. Namely, the coil 700 connected to the first coil terminal 800-1 is connected to the first contact terminal 900-1, and the coil 700' connected to the second coil terminal 800-2 is connected to the second contact terminal 900-2 so as to be connected to the second PCB 620.

Similarly, a coil terminal with respect to the second slot 100-2 and a coil terminal with respect to the third slot 100-3 are also connected to the coil end portions 800-3 to 800-6 and the contact terminals 900-3 to 900-6 so as to be connected to the second PCB 620.

Meanwhile, the second PCB 620 overlapping with the first PCB 610 and having a circular or semicircular shape includes coil terminals 800-6 to 800-12 corresponding to a number of coil end portions of the fourth slot 100-4 to the sixth slot 100-6. The coil terminals 800-7 to 800-12 are connected to coil end portions of the fourth slot 100-4 to the sixth slot 100-6, and the second PCB 720 may be connected to a winding present in the stator 300 through the contact terminals 900-1 to 900-6 of the first PCB 710 or may be shorted with the first PCB 710.

Also, any one of the coil terminals 800-7 to 800-12 may allow serially connected slots, namely, the fourth slot 100-4 connected in series with the first slot 100-1, the fifth slot 100-5 connected in series with the second slot 100-2, and the sixth slot 100-6 connected in series with the third slot 100-3 to be connected to a neutral point.

In an embodiment of the present invention, an implementation of a series winding disposition in which the second PCB 620 is rotated at a pre-set angle so as to be connected to the first PCB 710 will be described as an example, but the present invention is not necessarily connected thereto.

The second PCB 620 will be described by using the fourth slot 100-4 as an example. The third coil end portion (d) included in the fourth slot 100-4, in which a current flows in the first direction, is connected to the seventh coil terminal 800-7, and the fourth coil end portion (c) in which a current flows in the second direction is connected to the eighth coil terminal 800-8.

In this manner, a coil 700" connected to the second PCB 620 is connected to the first and second contact terminals 900-1 and 900-2 of the first PCB 610, and thus, the first PCB 610 and the second PCB 620 are connected. Similarly, the fifth slot 100-6 and the sixth slot 100-6 are also connected to the second PCB 620.

A method for connecting terminals in series through the first PCB 610 and the second PCB 620 described above will be described by using the first slot 100-1 and the fourth slot 100-4 as examples.

The first coil terminal 800-1 and the second coil terminal 800-2 of the first PCB 610 are terminals to which the first coil end portion (a) and the second coil end portion (b) of the first slot 100-1 are connected. The first contact terminal 900-1 and the second contact terminal 900-2 connect the first coil terminal 800-1 and the second coil terminal 800-2, and the seventh coil terminal 800-7 and the eight coil terminal 800-8 of the second PCB 720, respectively. Meanwhile, the second PCB 620 positioned upon being rotated at a certain angle (θ) from the first PCB 610 includes the seventh coil terminal 800-7 and the eighth coil terminal 800-8, and the seventh coil terminal 800-7 is connected to the third coil end portion d of the third slot 100-3, and the eighth coil terminal 800-8 is connected to the fourth coil end portion (c).

When a winding is connected in series, the first coil end portion (a) of the first slot 100-1 is led out as an external withdrawal line through the first coil terminal 800-1 and the first contact terminal 900-1 of the first PCB 610. As a result, connection is made in the form of the first coil terminal 800-1(a)-first contact terminal 900-1(a'), and after being connected, the first coil end portion (a) is used as an external withdrawal line.

The second coil end portion (b) of the first slot 100-1 is connected to a second contact terminal 900-2(b') through the second coil terminal 800-2 of the first PCB 610, and connected through the seventh coil terminal 800-7 to which the third coil terminal (d) of the second PCB 620 is connected. The eighth coil terminal 800-8 to which the fourth coil end portion (d) is connected is connected to a tenth coil terminal 800-10 and a twelfth coil terminal 800-12 so as to be connected together with other slots, to which the B-phase and C-phase currents are input, to the neutral point. Namely, in FIG. 5, a-a' is used as an external output line, b-b'-d are connected, and c is connected to the neutral point. In this manner, the winding is connected in series.

Meanwhile, the connection varying apparatus 600 in case that the winding is connected in parallel will be described with reference to FIG. 6.

As illustrated in FIG. 6, when a winding is connected in parallel, unlike the case in which the winding is connected in series, the second PCB 620 overlaps with the first PCB 610 so as to be used, without being rotated at a pre-set certain angle.

The first PCB 6610 has a circular shape and includes coil terminals 800-1 to 800-6 corresponding to a number of coil end portions of the first slot 100-1 to the third slot 100-3. The first PCB 610 further includes the contact terminals 900-1 to 900-6 corresponding to the number of coil end portions. Here, the coil terminals 800-1 to 800-6 are terminals to which the coil end portions formed in the first slot 100-1 to the third slot 100-3 are connected, and the contact terminals 900-1 to 900-6 are terminals for connecting the coil terminals 800-1 to 800-6 and the second PCB 720.

The first PCB 610 will be described by using a part with respect to the first slot 100-1 as an example. The first coil end portion (a) included in the first slot 100-1, in which a current flows in the first direction, is connected to the first coil terminal 800-1, and the second coil end portion (b) in which a current flows in the second direction is connected to the second coil terminal 800-2. In this manner, the coil connected to the first PCB 610 is connected to the contact terminals 900-1 and 900-2. Namely, the coil 700 connected to the first coil terminal 800-1 is connected to the first contact terminal 900-1, and the coil 700' connected to the second coil terminal 800-2 is connected to the second contact terminal 900-2, so as to be connected to the second PCB 620, respectively.

Similarly, a coil terminal with respect to the second slot 100-2 and a coil terminal with respect to the third slot 100-3 are also connected together with the coil end portions 800-3 to 800-6 to the contact terminals 900-3 to 900-6 so as to be connected to the second PCB 620.

Meanwhile, referring to the second PCB 620 overlapping with the first PCB 610 and having a circular or semicircular shape, the second PCB 620 includes coil terminals 800-7 to 800-12 corresponding to the number of the coil end portions of the fourth slot 100-4 to the sixth slot 100-6. The coil terminals 800-7 to 800-12 may be connected to the coil end portions of the fourth slot 100-4 to the sixth slot 100-6, and the second PCB 720 may be connected to a winding present in the stator 300 through the contact terminals 900-1 to 900-6 of the first PCB 710 or shorted from the first PCB 710.

Also, any one of the coil terminals 800-7 to 800-12 may allow the slots connected in series, namely, the fourth slot 100-4 connected in series with the first slot 100-1, the fifth slot 100-5 connected in parallel with the second slot 100-2, and the sixth slot 100-6 connected in parallel with the third slot 100-3 to be connected to the neutral point.

The second PCB 620 will be described by using the fourth slot 100-4 as an example. The third coil end portion (d) included in the fourth slot 100-4, in which a current flows in the first direction, is connected to the seventh coil terminal 800-7, and the fourth coil end portion (c) in which a current flows in the second direction is connected to the eighth coil terminal 800-8. In this manner, the coil connected to the second PCB 620 is connected to the first and second contact terminals 900-1 and 900-2 of the first PCB 610, whereby the first PCB 610 and the second PCB 620 are connected. Similarly, the fifth slot 100-5 and the sixth slot 100-6 are also connected to the second PCB 620.

A method for connecting terminals in parallel through the first PCB 610 and the second PCB 620 as described above will be described by using the first slot 100-1 and the fourth slot 100-4 as an example.

The first coil end portion (a) is connected to the first coil terminal 800-1 of the first PCB 610 and subsequently connected to the first contact terminal 900-1. Thereafter, the first contact terminal 900-1 is connected to the seventh coil terminal 800-7, and the third coil end portion (d) connected to the seventh coil terminal 800-7 is used as an external withdrawal line.

The second coil end portion (b) is connected to the eighth coil terminal 800-8 through the second coil terminal 800-2 and the second contact terminal 900-2. The second coil end portion (b0 and the fourth coil end portion (c) connected through the eighth coil terminal 800-8 are connected to the tenth coil terminal 800-10 and the twelfth coil terminal 800-12 so as to be connected to the neutral point of the other two remaining phases. In this manner, the winding is connected in parallel.

As described above, the connection varying apparatus 600 according to an embodiment of the present invention allows a motor to have a series winding and a parallel winding according to the position of the first PCB 610 and the second PCB 620, and the position of the second PCB 620 may be formed to have a structure with a protrusion to allow a user to easily manipulate the motor from outside.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A motor comprising:
   a first slot and a second slot in which a first current having the same phase flows, the first slot including a first coil end portion in which a current flows in a first direction and a second coil end portion in which a current flows in the opposite direction of the first direction, and the second slot including a third coil end portion in which a current flows in the second direction and a fourth coil end portion in which a current flows in the first direction;
   a stator forming a fixed magnetic field by the first current;
   a rotor forming a rotating field and rotated according to an interaction with the fixed magnetic field formed by the stator; and
   a connection varying apparatus configured to dispose a winding connected in series or in parallel by selectively connecting one or more of the first coil end portion and the second coil end portion of the first slot and the third coil end portion and the fourth coil end portion of the second slot,
   wherein the stator comprises:
   third and fourth slots in which a second current having a phase 120-degree faster than the first current, and
   fifth and sixth slots in which a third current having a phase 120-degree slower than the first current,
   wherein the third slot, the fourth slot, the fifth slot, and the sixth slot comprise a coil end portion in a first current direction in which a current flows in the first direction and a coil end portion in a second current direction in which a current flows in the second direction, respectively.

2. A motor comprising:
   a first slot and a second slot in which a first current having the same phase flows, the first slot including a first coil end portion in which a current flows in a first direction and a second coil end portion in which a current flows in the opposite direction of the first direction, and the second slot including a third coil end portion in which a current flows in the second direction and a fourth coil end portion in which a current flows in the first direction;
   a stator forming a fixed magnetic field by the first current;
   a rotor forming a rotating field and rotated according to an interaction with the fixed magnetic field formed by the stator; and
   a connection varying apparatus configured to dispose a winding connected in series or in parallel by selectively connecting one or more of the first coil end portion and the second coil end portion of the first slot and the third coil end portion and the fourth coil end portion of the second slot,
   wherein the connection varying apparatus comprises:
   a first PCB including a first coil terminal and a second coil terminal electrically connected to the first coil end portion and the second coil end portion of the first slot, respectively, and a first contact terminal and a second contact terminal electrically connected to the first coil terminal and the second coil terminal, respectively; and
   a second PCB connected to the first PCB through the first contact terminal or the second contact terminal and including a third coil terminal and a fourth coil terminal connected to the third coil end portion and the fourth coil end portion.

3. The motor of claim 2, wherein a winding is connected in the form of any one of a series winding and parallel winding by selectively connecting any one of the first contact terminal and the second contact terminal of the first PCB and any one of the third coil terminal and the fourth coil terminal of the second PCB.

4. The motor of claim 3, wherein the first PCB and the second PCB are positioned in an overlap manner, and
   any one or more of the first contact terminal and the second contact terminal of the first PCB and any one or more of the third coil terminal and the fourth coil terminal of the second PCB are selectively connected by adjusting a relative rotation angle between the first PCB and the second PCB.

5. The motor of claim 1, wherein the connection varying apparatus comprises:
   a first PCB including a first coil terminal and a second coil terminal electrically connected to the first coil end portion and the second coil end portion of the first slot, respectively, and a first contact terminal and a second contact terminal electrically connected to the first coil terminal and the second coil terminal, respectively; and
   a second PCB connected to the first PCB through the first contact terminal or the second contact terminal and including a third coil terminal and a fourth coil terminal connected to the third coil end portion and the fourth coil end portion.

6. The motor of claim 5, wherein a winding is connected in the form of any one of a series winding and parallel winding by selectively connecting any one of the first contact terminal and the second contact terminal of the first PCB and any one of the third coil terminal and the fourth coil terminal of the second PCB.

7. The motor of claim 6, wherein the first PCB and the second PCB are positioned in an overlap manner, and
   any one or more of the first contact terminal and the second contact terminal of the first PCB and any one or more of the third coil terminal and the fourth coil terminal of the second PCB are selectively connected by adjusting a relative rotation angle between the first PCB and the second PCB.

8. A motor comprising:
   a first slot and a second slot in which a first current having the same phase flows, the first slot including a first coil end portion in which a current flows in a first direction and a second coil end portion in which a current flows in the opposite direction of the first direction, and the second slot including a third coil end portion in which a current flows in the second direction and a fourth coil end portion in which a current flows in the first direction;
   a stator forming a fixed magnetic field by the first current;
   a rotor forming a rotating field and rotated according to an interaction with the fixed magnetic field formed by the stator; and
   a connection varying apparatus configured to dispose a winding connected in series or in parallel by selectively connecting one or more of the first coil end portion and the second coil end portion of the first slot and the third coil end portion and the fourth coil end portion of the second slot,
   wherein the connection varying apparatus electrically connects the first coil end portion and the third coil end portion, electrically connected the second coin end portion and the fourth coil end portion, and connects the first and second slot in parallel, and
   wherein the connection varying apparatus comprises:
   a first PCB including a first coil terminal and a second coil terminal electrically connected to the first coil end portion and the second coil end portion of the first slot, respectively, and a first contact terminal and a second contact terminal electrically connected to the first coil terminal and the second coil terminal, respectively; and a second PCB connected to the first PCB through the first contact terminal or the second contact terminal and including a third coil terminal and a fourth coil terminal connected to the third coil end portion and the fourth coil end portion.

9. The motor of claim 8, wherein a winding is connected in the form of any one of a series winding and parallel winding by selectively connecting any one of the first contact terminal and the second contact terminal of the first PCB and any one of the third coil terminal and the fourth coil terminal of the second PCB.

10. The motor of claim 9, wherein the first PCB and the second PCB are positioned in an overlap manner, and
   any one or more of the first contact terminal and the second contact terminal of the first PCB and any one or more of the third coil terminal and the fourth coil terminal of the second PCB are selectively connected by adjusting a relative rotation angle between the first PCB and the second PCB.

11. The motor of claim 1, wherein the connection varying apparatus connects the first slot and the second slot in series by electrically connecting the second coil end portion and the third coil end portion.

12. The motor of claim 1, wherein the connection varying apparatus connects the first coil end portion and the third coil end portion, electrically connecting the second coil end portion and the fourth coil end portion, and connects the first and second slot in parallel.

13. The motor of claim 2, wherein the connection varying apparatus connects the first slot and the second slot in series by electrically connecting the second coil end portion and the third coil end portion.

14. The motor of claim 2, wherein the connection varying apparatus electrically connects the first coil end portion and the third coil end portion, electrically connects the second coil end portion and the fourth coil end portion, and connects the first and second slot in parallel.

* * * * *